United States Patent
Kinebuchi et al.

(10) Patent No.: US 10,547,664 B2
(45) Date of Patent: Jan. 28, 2020

(54) ENABLE UPLOADING AND SUBMITTING MULTIPLE FILES

(71) Applicant: Oracle International Corporation, Redwood Shores, CA (US)

(72) Inventors: Kentaro Kinebuchi, San Francisco, CA (US); Blake Sullivan, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1321 days.

(21) Appl. No.: 13/848,648

(22) Filed: Mar. 21, 2013

(65) Prior Publication Data
US 2014/0289367 A1 Sep. 25, 2014

(51) Int. Cl.
*H04L 29/08* (2006.01)

(52) U.S. Cl.
CPC ................................. *H04L 67/02* (2013.01)

(58) Field of Classification Search
CPC . H04L 67/42; H04L 67/1095; H04L 67/1097; H04L 67/06; H04L 67/2842; H04L 67/36; H04L 67/1078; H04L 67/108; H04L 67/146; H04L 41/42; H04L 29/06047; H04L 43/045; H04L 45/745; H04L 65/1059; H04L 65/1083; H04L 65/602; G06F 3/0482; G06F 3/04842; G06F 3/0484; G06F 3/1257; G06F 3/127; G06F 11/3438
USPC ................. 709/203–204, 219–220; 707/769; 715/255

See application file for complete search history.

(56) References Cited

U.S. PATENT DOCUMENTS

| | | | |
|---|---|---|---|
| 6,317,777 B1 | 11/2001 | Skarbo et al. | |
| 6,751,618 B1* | 6/2004 | Germscheid | G06F 21/6218 |
| 7,987,449 B1* | 7/2011 | Marolia | G06F 8/68 |
| | | | 709/220 |
| 2004/0107417 A1* | 6/2004 | Chia | G06F 8/65 |
| | | | 717/171 |
| 2006/0059107 A1* | 3/2006 | Elmore | G06Q 10/06 |
| | | | 705/64 |
| 2006/0221190 A1* | 10/2006 | Limberis | G06F 17/30056 |
| | | | 348/207.1 |
| 2007/0016660 A1 | 1/2007 | Wilson | |
| 2007/0239464 A1* | 10/2007 | Carroll | G06Q 10/10 |
| | | | 705/300 |

(Continued)

FOREIGN PATENT DOCUMENTS

| CN | 1921397 A | 2/2007 |
|---|---|---|
| KR | 2000015728 | 3/2000 |

OTHER PUBLICATIONS

Yahoo! recommends YUI 3; obtained at http://developer.yahoo.com/yui/uploader/#using; Jan. 7, 2013; 4 pages.

(Continued)

*Primary Examiner* — Younes Naji
*Assistant Examiner* — Da T Ton
(74) *Attorney, Agent, or Firm* — Trellis IP Law Group, PC (57) ABSTRACT

An atomic multiple-file upload from a client to a server requires only a single Java Server Faces (JSF) lifecycle to process the multiple files uploaded. Progress and other upload status indicators are displayed at the client and individual files can be deleted, canceled or added prior to committing the multiple-file upload at the server.

23 Claims, 7 Drawing Sheets

(56) References Cited

U.S. PATENT DOCUMENTS

| | | | |
|---|---|---|---|
| 2008/0295130 A1 | 11/2008 | Worthen | |
| 2010/0082535 A1* | 4/2010 | Kamal | G06Q 30/00 |
| | | | 707/610 |
| 2011/0055721 A1* | 3/2011 | Jain | G06Q 30/02 |
| | | | 715/748 |
| 2012/0089706 A1* | 4/2012 | Collins | H04N 1/00244 |
| | | | 709/219 |
| 2012/0233205 A1 | 9/2012 | McDermott | |
| 2012/0331394 A1* | 12/2012 | Trombley-Shapiro | |
| | | | H04L 67/06 |
| | | | 715/748 |
| 2013/0198788 A1* | 8/2013 | Barger | H04N 21/2668 |
| | | | 725/93 |
| 2013/0212432 A1* | 8/2013 | Guthrie | G06F 11/0709 |
| | | | 714/16 |
| 2014/0181969 A1* | 6/2014 | Mousty | H04L 63/1408 |
| | | | 726/23 |

OTHER PUBLICATIONS

File Entry; obtained at http://res.icesoft.org/docs/v3_latest/ace/t1d/ace/fileEntry.html; Jan. 7, 2013; 4 pages.

File Entry—ICEfaces; obtained at http://www.icesoft.org/wiki/display/ICE/FileEntry; Jan. 7, 2013; 4 pages.

ASP Uploader for Classic ASP obtained at http://aspuploader.com/default.html; Jan. 7, 2013; 1 page.

ASP Uploader obtained at http://aspuploader.com/Features.html; Jan. 7, 2013; 1 page.

Selecting Multiple Files for Upload obtained at http://aspuploader.com/demo/form-multiplefiles.asp; Jan. 7, 2013; 1 page.

Mahara User Manual obtained at http://manual.mahara.org/en/1.5/content/files.html; Jan. 7, 2013; 6 pages.

* cited by examiner

| File name | File size | Delete icon | | |
|---|---|---|---|---|
| File 1 | 5 MB | x | | File waiting for the upload button to be pressed so that file upload can begin |
| File 1 | 5 MB | [progress bar] x | | Upload of this file is in progress, progress indicates level of completion |
| File 1 | 5 MB | [progress bar] x | | File waiting for the previous file to complete upload so That it can begin upload |
| File 1 | 5 MB | Failed | ⟳ Retry icon | File upload encounters an error. Displays the retry icon and the "Fail" message |
| File 1 | 5 MB | Done | x | File upload complete - indicated by the "Done" message |

ENABLE UPLOADING AND SUBMITTING MULTIPLE FILES

BACKGROUND

Many Web applications require that a user be enabled to select and upload multiple files, see the upload status for each file, potentially cancel individual uploads and then submit all the files together with other data on the same form on the page after the upload has completed.

In addition, the files to be uploaded may exceed certain browser or server file size limitations. A conventional form submit cannot be used because the ability to cancel the upload of individual files in a set of multiple files is not enabled. Existing Java Server Faces (JSF) frameworks have so far provided only single file upload components or multiple-file upload components which are implemented as a series of single file uploads.

SUMMARY

One example embodiment is a component, displayed in a web form, for atomically uploading multiple files from a web application, executing on a client computer, to a server. The component provides the capability to select and upload multiple files, view the upload status of each file, potentially cancel an individual file upload and then submit the multiple uploaded files atomically after the upload has completed.

In an example embodiment, a web server application responds to a parameter value of "multiple" in a request header to store received files in a session map and to not process the multiple files until a submit message is received from the web application.

In an example embodiment, the server application goes through only one Java Server Faces (JSF) lifecycle after all multiple files are successfully uploaded to the server.

In an example embodiment, the server application sends status indications to the web application which are displayed in the component. Status indications include progress of a file upload and failure of a file upload.

A further understanding of the nature and the advantages of particular embodiments disclosed herein may be realized by reference to the remaining portions of the specification and the attached drawings.

DETAILED DESCRIPTION OF EMBODIMENTS

In the following a "file upload" is used to describe a procedure for transferring a file from a client computer to a server computer over a network. A first example embodiment will be described in the context of a client computer running a web browser application such as, for example, MS Internet Explorer, Mozilla FireFox or Google Chrome and where the server is a web server utilizing web components including, for example, Java servlets, Java Server Pages (JSP) pages, and/or web service endpoints.

Figure 1:
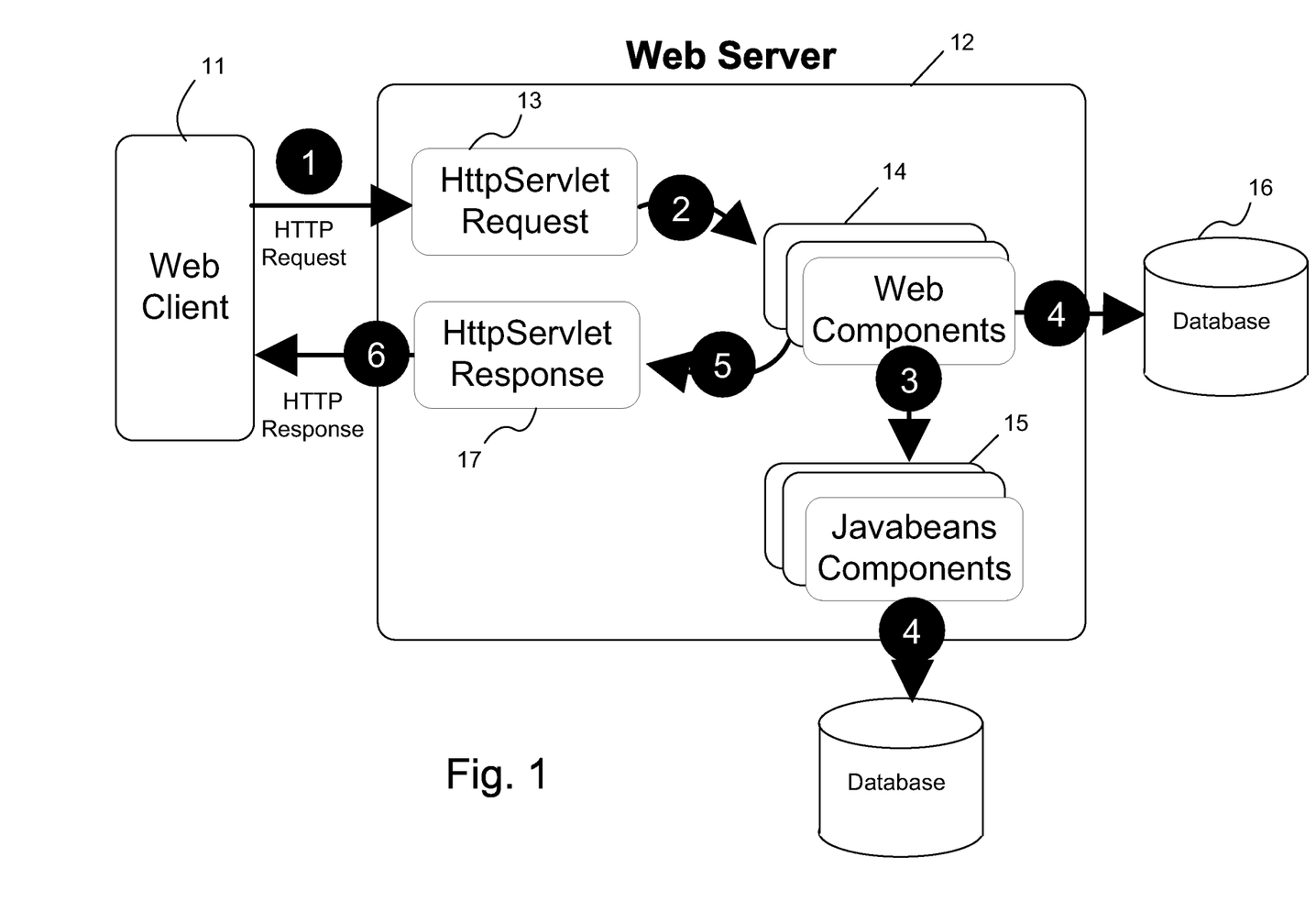
FIG. 1 is a block diagram illustrating a client computer and a server computer coupled by the internet.

An example interaction between a web client and a web application is illustrated in FIG. 1. The client 11 sends a Hypertext Transfer Protocol (HTTP) request to the web server 12. A web server, that implements Java Servlet and JavaServer Pages technology, converts the request into an HTTPServletRequest object 13. This object is delivered to a web component 14, which can interact with JavaBeans components 15 or a database 16 to generate dynamic content. The web component can then generate an HTTPServletResponse 17 or it can pass the request to another web component. Eventually a web component generates a HTTPServletResponse object 17. The web server converts this object to an HTTP response and returns it to the client.

A servlet is a Java programming language class that is used to extend the capabilities of servers that host applications accessed by means of a request-response programming model. JSP pages are text-based documents that execute as servlets but allow a more natural approach to creating static content. Servlets are best suited for service-oriented applications (web service endpoints are implemented as servlets) and the control functions of a presentation-oriented application, such as dispatching requests and handling nontextual data. JSP pages are more appropriate for generating text-based markup such as Hypertext Markup Language (HTML), Scalable Vector Graphics (SVG), Wireless Markup Language (WML), and Extended Markup Language (XML).

The Java Application Development Framework (ADF) includes components for web applications. One such component is af:inputFile. Currently, af:inputFile only supports uploading files one at a time and the server-side renderer renders a native HTML <input type="file"> element for af:inputFile. Beginning in HTML 5, the input Tag will support the attribute "multiple" to indicate whether to enable multiple file selection. Example embodiments take advantage of this feature to support multiple file uploads in af:inputFile.

The current af:inputFile component itself supports two actions: Upload File (Click Browse Button) and Change File (Click Update Button). When the current af:inputFile component contains a file, the server-side renderer does not render the native <input type="file"> HTML element. Instead the content it renders is the name of the file and a button to launch an update dialog.

In this example embodiment, the current af:inputFile component is modified to form a modified af:inputFile component that supports the ability to upload, add, remove, and change multiple file upload selections as well as display the progress of the upload of the multiple files. The modified af:inputFile component renders a file list and the buttons: browse, upload and cancel. This modified af:inputFile component will be referred to as af:inputFile(multiple) in the following discussion.

The user interfaces rendered at the client side during a multiple file update using the af:inputFile(multiple) component will now be described. The af:inputFile(multiple) component is rendered on a page, for example a form, that includes a Submit button that submits the form data to the server.

Figure 2A:
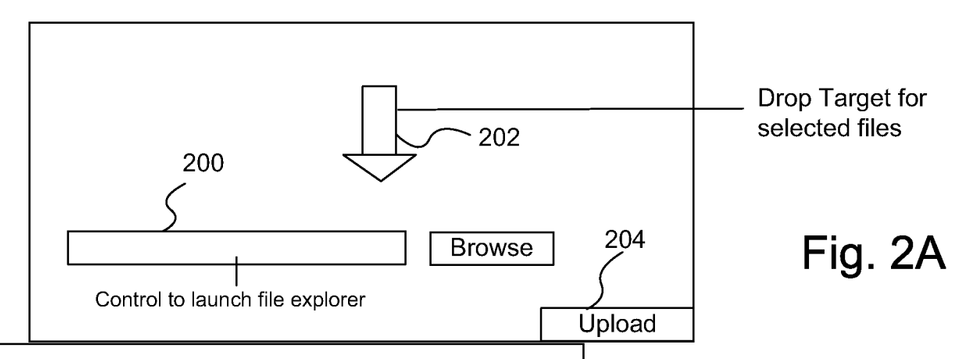
FIGS. 2A and 2B are screen shots illustrating an example multiple-file selection and upload component.
Figure 2B:
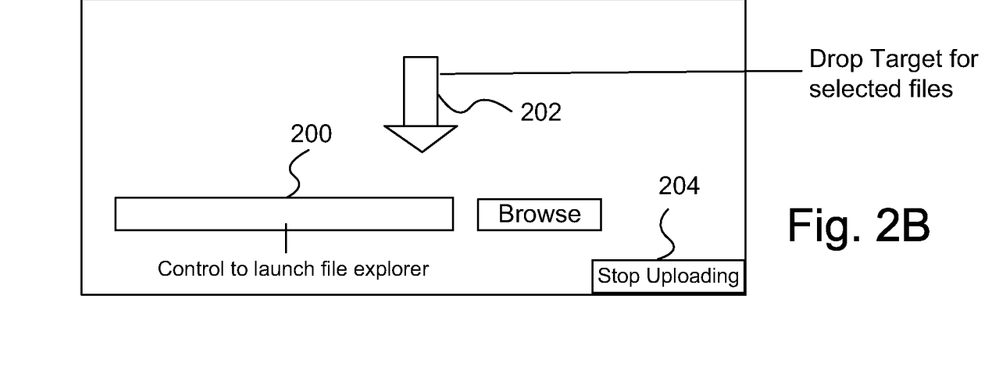

As depicted in FIGS. 2A and 2B, in an example embodiment the file upload component includes a native file select element (BROWSE) 200 to select files via the file system GUI, a drop zone 202 to drop files dragged from the desktop and a control 204 to start or stop uploading or to start or stop the file upload process. In FIG. 2A the control 204 is the Upload control displayed when files are present to start the upload process and in FIG. 2B the control 204 is the Stop Uploading control displayed to stop the upload process after an upload has commenced.

Figure 3A:
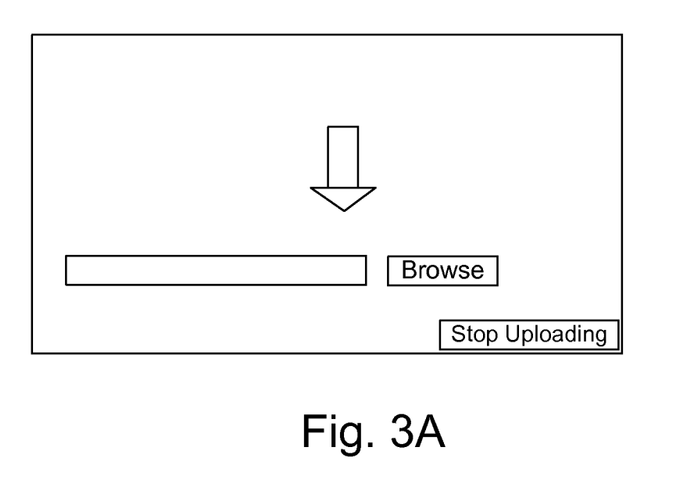
FIGS. 3A and 3B are screen shots illustrating an example file selection component.
Figure 3B:
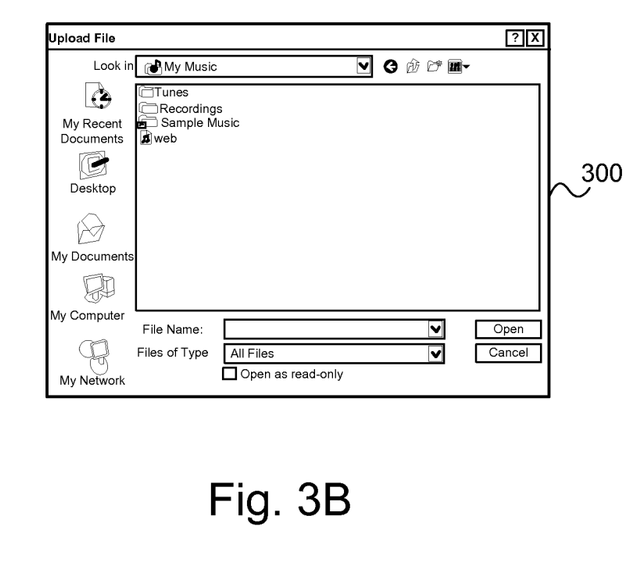

FIGS. 3A and 3B depict a browser native file explorer pop-up 300 that is displayed once the user clicks the Browse button 200 to allow selection of multiple files.

Figure 4:
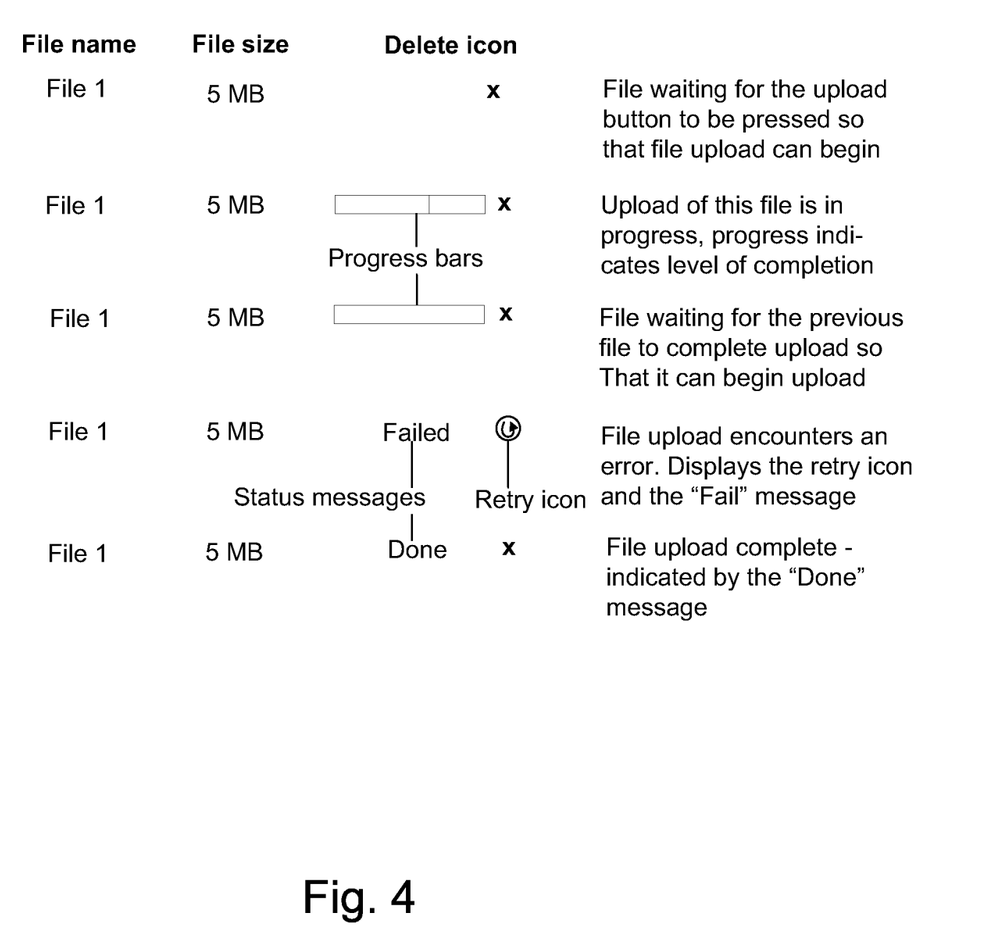
FIG. 4 is a schematic diagram illustrating an example of multiple-file upload status indications and controls.

FIG. 4 depicts example status indications displayed by the component for a component after the upload of the file begins. The selected files are displayed in a file list together with the size of each file. As depicted in FIG. 4, when a file is placed in the file upload component, the file upload component displays the file name, file size and a delete icon (x) to delete the file. If the upload process has begun, then the progress bar is displayed next to the file. If the file is waiting for its turn to be uploaded, then an empty progress bar is displayed. If an error is encountered during the file upload process, then the fail message with the retry icon is displayed. If the file upload is complete then the "Done" message appears. The user may also add additional files to be uploaded anytime after the upload process has begun. Such files will be automatically uploaded once the existing files in the list have finished uploading.

In the following discussion the term atomic defines a multiple-file upload that is not committed until all individual file uploads of the multiple-file upload are complete.

Figure 5:
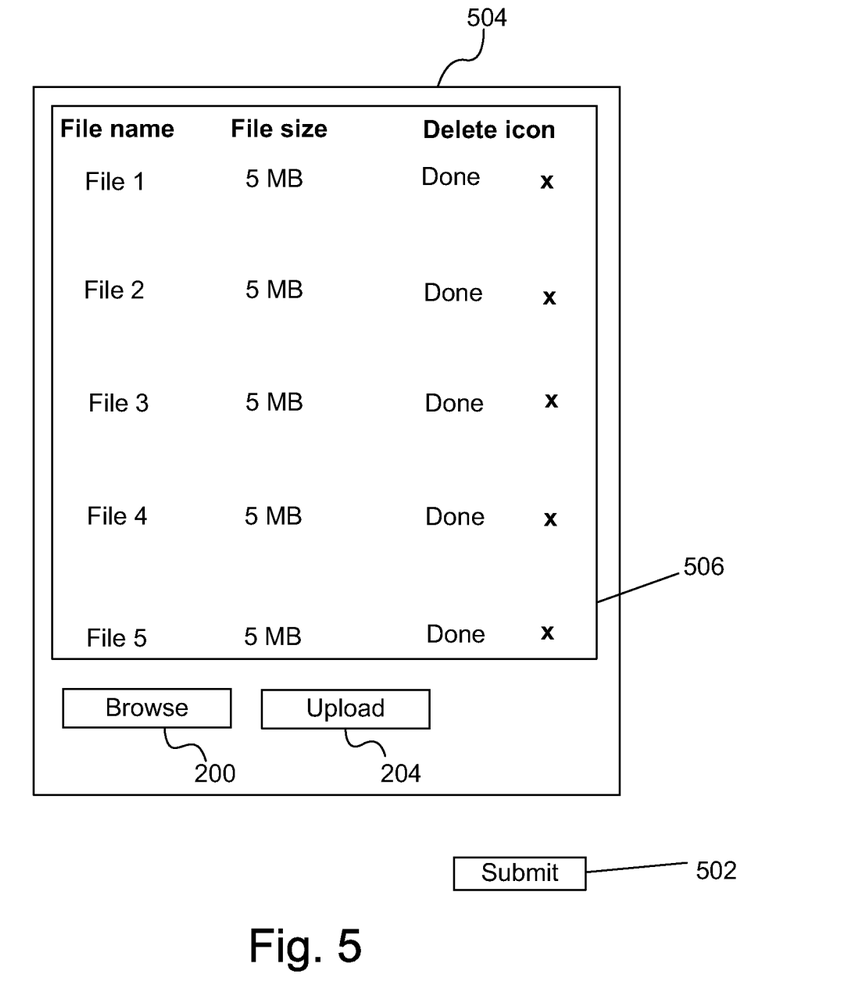
FIG. 5 is a screen shot of an example multiple-upload component displayed in a web page.

FIG. 5 depicts the Submit button 502 displayed on the page 504 together with the af:inputFile(multiple) component 506. The Submit button is added separately to the page and initiates a regular FORM submit when pressed. The atomicity of the multiple file upload is preserved an error message which will appear if the user presses the Submit button before the upload component indicates that all the user files have been successfully uploaded. During the actual process of uploading, the user is provided with progress indications and can add or delete files to the multiple file set to be uploaded.

The progress bar requires the browser to support XMLHttpRequest (XHR) Level 2. If XHR Level 2 support is not available then the progress bar will be rendered as an indeterminate progress bar. In this example embodiment, progress notification is provided by the browser by tracking how much data was sent to the server and does not involve server notification.

The atomic multiple-file upload provides important advantages to an application developer developing an application to consume the multiple uploaded files. For example, for an application developer providing a compression service for the multiple files uploaded to an archive it would be very difficult without the atomic multiple-file upload feature to determine when all of the multiple files were present in the archive at the server so the compression could begin. Unpredictable network delays could prevent the delivery of some of the files to be included in the archive.

Additionally, if processing on the archive were being performed, for example to determine maximum file size, then the work would have to be redone if files arrived after the work had commenced.

As described above, the user must press the Submit button on the page displayed to commit the atomic multiple-file upload at the server. In this example, the user is prompted to press the Submit button if the user leaves the page without pressing Submit. Prior to pressing the Submit button the user has the ability to change the files to be included in the atomic multiple-file upload.

The af:inputFile(multiple) component will add new attributes to the current af:inputFile to implement the atomic multiple-file upload functionality. These new added attributes will now be described.

A first new attribute is called uploadType which controls the type of upload component rendered at the client. If uploadType="auto", then there will be no Upload button and as soon as the user selects files they will appear in the file list and start uploading. If uploadType="manual", then the af:inputFile(multiple) component renders the Upload button and the user will need to click it to start the upload. If uploadType="form", then the upload will happen when the user clicks the submit button on the form. The uploadType="form" is the default.

The af:inputFile(multiple) component also adds a new optional attribute "maximumFiles" to the current af:inputFile component. The maximumFiles attribute is an integer whose default is 1. The attribute is used to restrict the number of files a user can upload. Restricting the number of files is a common scenario so it is supported. If the user tries to upload more files than specified in maximumFiles then a validation error is returned. If maximumFiles is less than 1 then the number of files is unlimited.

Additional new attributes added to the af:inputFile(multiple) component are "rows" and "autoHeightRows".

The "rows" attribute determines the number of rows displayed in the file list. A scrollbar will be displayed when the number of files exceeds the number of rows specified by the attribute. In this example the default value is 5.

The "autoHeightRows" attribute is similar to the attribute in the af:table component. More specifically, it is the number of rows used to size the component height. The default value is −1 (no auto-sizing for any number of rows). A value of 0 can be used to default the autoHeightRows to the current rows attribute where the "autoHeightRows" value cannot be larger than the "rows" attribute value. If a value larger than rows is specified, the value is capped at the rows attribute. If a value larger than the number of rows is specified, the number of rows in the component is used to size the component height.

In this example embodiment, the UploadedFiles framework on the web server is changed to support uploading multiple files, saving multiple files to the session map providing status notifications for each file indicating, for example, whether the file failed to upload or was successful, cancelling individual file uploads, etc. Hence the endRequest dispose logic in the UploadedFiles framework is updated to not dispose of files for multiple-file upload requests during the upload of the files and instead disposes of the multiple file upload requests after the form is submitted, i.e., the sequence is that the user fills out the form, uploads multiple files, and then submits the form. This sequence assures the atomicity of the multiple-file upload. During the upload of the files, all the multiple uploaded files are retained at the server and the user can delete files and add files to the multiple file set. Once all selected files have been uploaded the submit happens and the multiple uploaded files enter the JSF lifecycle. During the atomic multiple-file upload the requests will not go through the JSF lifecycle.

An important result of these changes is that the JSF lifecycle is only gone through once after all the uploaded files have been successfully transferred to the web server. Enabling the ability to process multiple file uploads as well as any other arbitrary data on the page as part of a single JSF request is important because JSF application code is significantly simplified.

Competing JSF frameworks utilize multiple single-file uploads to perform a multiple-file upload and each single-file upload is processed in a separate JSF lifecycle so that significant application code needs to be written to keep track of those uploads and combine them.

The current UploadFiles framework disposes of a file after a request has been completed. However, as described above, the multiple file upload example embodiment being described provides interactions including the display of progress bars for each selected file in the set of multiple files being uploaded, cancellation of the upload of specific ones of the set of multiple files selected and retry of files in the set of multiple files that are not uploaded successfully. Thus, the upload of the set of multiple files must be atomic and all the above-described interactions must be completed before the multiple file upload is committed at the server.

In the atomic multiple-file upload case the multiple files coming in to the server during multiple upload requests are stored at the server and then once the regular submit occurs a single JSF lifecycle is entered with the multiple files already uploaded to the server. Currently, the uploaded files are stored in the RequestMap of the context but since the multiple files across multiple requests need to be stored, in this example embodiment, the context is modified to store the files in the SessionMap.

In this example embodiment, a new request header parameter is defined, and when the client peer is doing a multiple-file upload this parameter will be added and set to "multiple". When the web server sees this request, it will save the files in the SessionMap instead of the RequestMap (single file uploads will still go in the RequestMap). Since the files are stored in the SessionMap, when the user actually submits the form the multiple uploaded files will be available in the regular JSF lifecycle. The files will be disposed of by calling dispose( ) in the InputFileRenderer in the RenderResponse phase.

Figure 6:
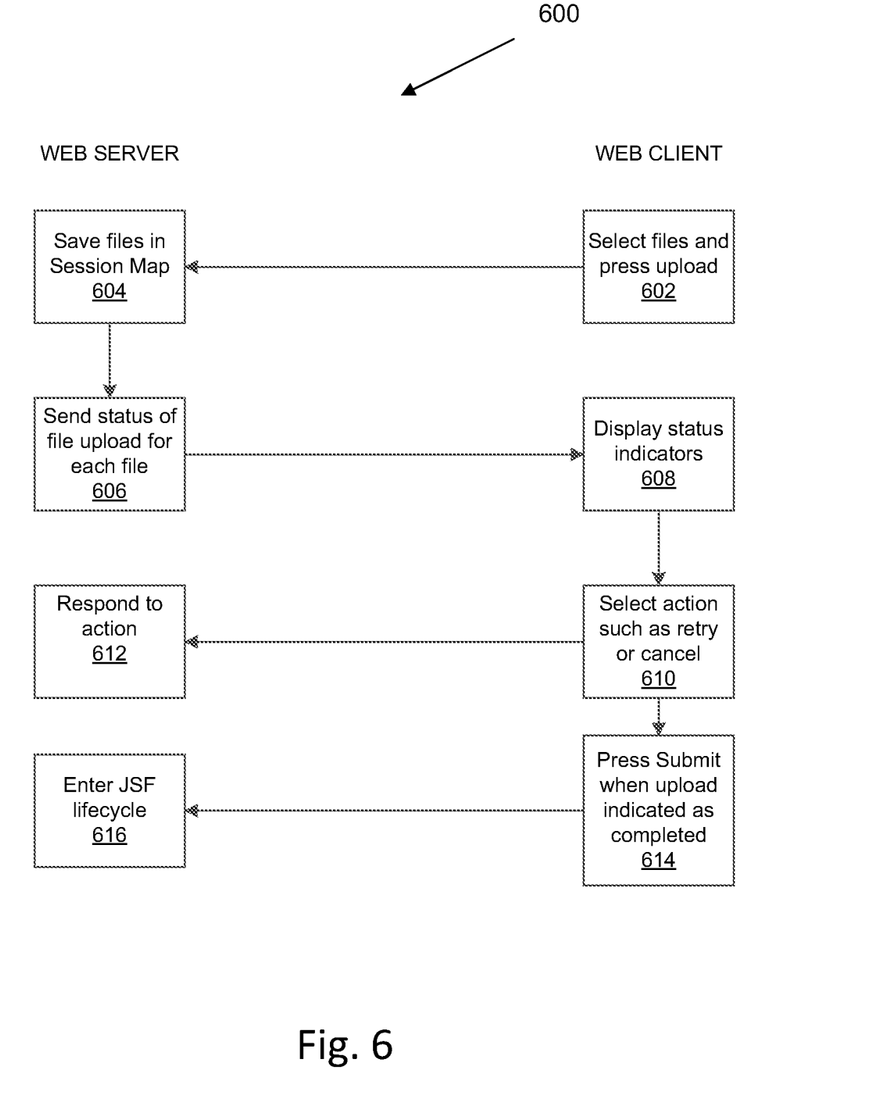
FIG. 6 is a flow chart illustrating an example of process steps performed by a web server application.

FIG. 6 is a flow chart 600 illustrating the operation of an example embodiment. In process step 602 the user interacts with the displayed file upload component to select files to be uploaded as described above with reference to FIGS. 2A and 2B. If the uploadType is set to "manual" then the upload button is displayed and selected files are uploaded to the web server when the upload button is pressed. If the uploadType is set to "auto" then the upload starts when a file is selected.

In process step 604 the web server saves the uploaded files in the SessionMap to preserve the atomicity of the multiple file upload.

In process step 606 the web server sends messages indicating the status of each file upload.

In process step 608 the file upload component displayed on the web client displays the various status indicators described above with reference to FIG. 4 and in process step 610 the user may select actions such as retry or cancel.

In process step 612 the web server responds to any actions selected by the user.

In process step 614 the user presses the submit button when the upload of all selected files is completed and in process step 616 the web server enters the JSF lifecycle to atomically complete processing of the uploaded multiple files.

Figure 7:
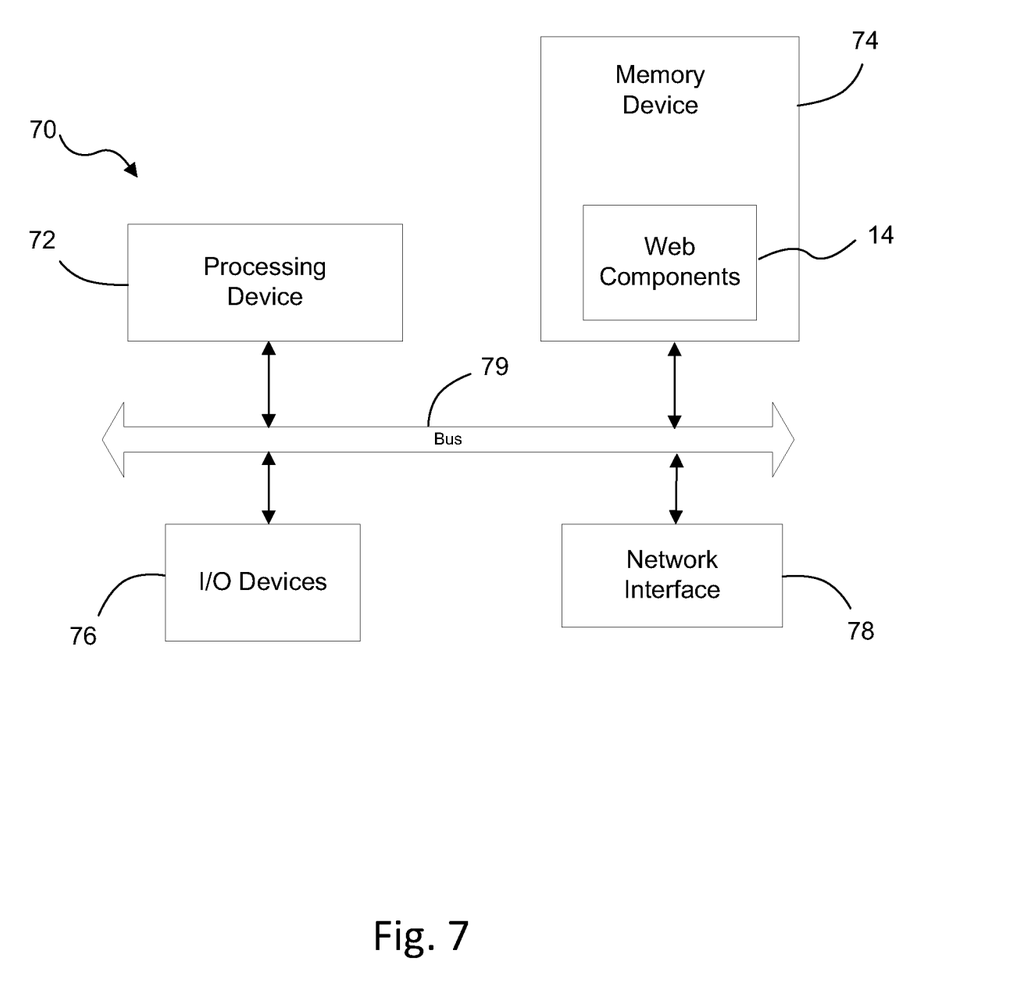
FIG. 7 is a block diagram of an example client or server computer.

FIG. 7 is a block diagram of an embodiment of a computer system 70 that can be used as a web server or web client. In this embodiment, computer system 70 includes a processing device 72, a memory device 74, input/output (I/O) devices 76, and a network interface 78, each interconnected via a bus 79. Processing device 72 may be a general-purpose or specific-purpose processor or microcontroller. Computer system 70 can be configured from multiple devices in multiple locations.

In this embodiment, memory device 74 is configured to store data and program code including web components 14. Memory device 74 may include one or more internally fixed storage units, removable storage units, and/or remotely accessible storage units. The storage units can be configured to store information, data, instructions, and/or software code. The storage units may include any combination of volatile memory and/or non-volatile memory such a DRAM, disc drives, flash memory, SRAM, etc.

Memory device 74 can also store program code that enables processing device 72 to execute procedures for enabling one or more users to interact with web components. Various logical instructions or commands may be included in the program code for reviewing and manipulating the web components. The embodiments of web components described in the present disclosure can be implemented in hardware, software, firmware, or a combination thereof. When implemented in software or firmware, web components 14 can be stored in memory device 74 and executed by processing device 72. When implemented in hardware, the web components and other systems can be implemented in processing device 72 using discrete logic circuitry, an application specific integrated circuit (ASIC), a programmable gate array (PGA), a field programmable gate array (FPGA), other suitable logic circuit, or any combination thereof.

Web components and/or other related circuitry and systems, which can be stored partially or fully in memory device 74, and any other software, programs, or computer code including executable logical instructions as described herein, can be embodied in non-transitory computer-readable media for execution by any suitable processing device, such as processing device 72. The computer-readable media as described herein can include one or more suitable physical media components that can store the software, programs, or computer code for a measurable length of time.

I/O devices 76 may include input mechanisms such as keyboards, keypads, cursor control devices, or other data entry devices for entering information in memory device 74. I/O devices 76 may also include output devices, such as computer monitors, audio output devices, printers, or other peripheral devices for communicating information to a user.

Although particular embodiments are described herein, these particular embodiments are merely illustrative, and not restrictive. For example, the specific attributes described above are by way of example and other techniques for modifying the upload component could be utilized based on the teachings of the present application. The particular iconic representations described in the example user interfaces may be changed. Accordingly, the scope of the invention is limited only be the appended claims.

Any suitable programming language can be used to implement the routines of particular embodiments, including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software, firmware or hardware or a combination of all three. The control logic, when executed by one or more processors, may be operable to perform that which is described in particular embodiments.

Particular embodiments may be implemented by using a programmed general purpose digital computer, application specific integrated circuits, programmable logic devices, field programmable gate arrays, and/or optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an" and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by one or more processors at a server computer, for performing an atomic multiple-file upload comprising:
   receiving, at the server computer, a request to atomically upload multiple files of the atomic multiple-file upload from a client computer to the server computer, where the client computer and the server computer are coupled to a network;
   during processing of the request to atomically upload the multiple files, receiving an additional file from the client computer and adding the additional file to the atomic multiple-file upload;
   during the processing of the request to atomically upload the multiple files, deleting one file from the atomic multiple-file upload;
   saving, using the one or more processors, each file of the atomic multiple-file upload uploaded by the client computer in a session map;
   sending status indicators to the client computer indicating status of an upload of a file from the client computer to the server computer;
   receiving a submit message from the client computer indicating a user activated a submit control at the client computer only after completion of the uploading to the atomic multiple-file upload to the server computer;
   atomically processing, using the one or more processors, all files in the atomic multiple-file upload only after the submit message has been received from the client computer;
   providing, using the one or more processors, a single Java Server Faces (JSF) lifecycle for the uploaded files of the atomic multiple-file upload;
   receiving, using the one or more processors, a message from the client computer that uploading of the multiple files in the atomic multiple-file upload is completed; and
   performing, using the one or more processors, the single Java Server Faces (JSF) lifecycle, using the one or more processors, on all uploaded files stored in the session map when the atomic multiple-file upload is complete.

2. The method of claim 1 further comprising: responding, using the one or more processors, to messages from the client computer to delete a file or cancel an upload.

3. The method of claim 1 where the saving each file in the session map further comprises:
   storing, using the one or more processors, an uploaded file in the session map if a request header parameter is set to a "multiple" value.

4. The method of claim 1 further comprising: disposing, using the one or more processors, of the multiple files in the atomic multiple-file upload after the JSF lifecycle is completed.

5. A method, performed by one or more processors at a client computer, for performing an atomic multiple-file upload to a server computer and where the client computer and the server computer are coupled to a network, comprising:
   displaying, using the one or more processors, a component including a file select control for selecting multiple files to atomically upload to the server computer and an upload control to begin an atomic upload of selected multiple files, with the component included in a page having a submit control;
   setting, using the one or more processors, a parameter included in a header of a request to a value "multiple", wherein the request specifies atomically uploading the selected multiple files;
   transmitting the request to the server computer when the upload control is activated;
   during processing of the request, transmitting an additional file from the client computer to the server computer with a request to add the additional file to the atomic multiple-file upload;
   during the processing of the request, transmitting a request to delete one file from the atomic multiple-file upload;
   transmitting, using the one or more processors, a message from the client computer to the server computer indicating that uploading the multiple files in the atomic multiple-file upload is complete; and
   enabling, using the one or more processors, the submit control, defined on the displayed page including the component, wherein the submit control is enabled without error when all files in the atomic multiple-file upload have finished uploading, and wherein the submit control initiates a single Java Server Faces (JSF) lifecycle for the uploaded files of the atomic multiple-file upload stored in a session map after the atomic multiple-file upload is complete.

6. The method of claim 5 further comprising:
receiving status indications from the server computer; and
displaying, using the one or more processors, the status indications.

7. The method of claim 5 further comprising:
displaying, using the one or more processors, a progress bar for a file being uploaded indicating what portion of the file has been uploaded.

8. The method of claim 6 where the displaying the status indications further comprises:
displaying, using the one or more processors, a failed icon if an upload of a particular file to the server computer fails and a retry control to retry uploading the particular file to the server computer.

9. A server computer comprising:
one or more digital processors coupled to a display and to a non-transitory processor-readable storage device, with the one or more digital processors configured to execute on or more instructions included in the non-transitory processor-readable storage device to perform the following acts:
receiving, at the server computer, a request to atomically upload multiple files of an atomic multiple-file upload from a client computer to the server computer, where the client computer and the server computer are coupled to a network;
during processing of the request to atomically upload the multiple files, receiving an additional file from the client computer and adding the additional file to the atomic multiple-file upload;
during the processing of the request to atomically upload the multiple files, deleting one file from the atomic multiple-file upload;
saving each file of the atomic multiple-file upload uploaded by the client computer in a session map;
sending status indicators to the client computer indicating status of an upload of a file from the client computer to the server computer;
receiving a submit message from the client computer indicating a user activated a submit control at the client computer only after completion of the uploading to the atomic multiple-file upload to the server computer;
atomically processing all files in the atomic multiple-file upload only after the submit message has been received from the client computer;
providing a single Java Server Faces (JSF) lifecycle for the uploaded files of the atomic multiple-file upload;
receiving a message from the client computer that uploading of the multiple files in the atomic multiple-file upload is completed; and
performing the single Java Server Faces (JSF) lifecycle, using the one or more digital processors, on all uploaded files stored in the session map when the atomic multiple-file upload is complete.

10. The server computer of claim 9 with the one or more digital processors further configured to perform the act of:
responding to messages from the client computer to delete a file or cancel an upload.

11. The server computer of claim 9 where the saving each file in the session map further comprises:
storing an uploaded file in the session map if a request header parameter is set to a "multiple" value.

12. The server computer of claim 1 with the one or more digital processors further configured to perform the act of:
disposing of the multiple files in the atomic multiple-file upload after the JSF lifecycle is completed.

13. A non-transitory computer-readable storage medium comprising encoded program code for execution by one or more computer processors on a server computer, the program code when executed is executable to:
receiving, at the server computer, a request to atomically upload multiple files of an atomic multiple-tile upload from a client computer to the server computer, where the client computer and the server computer are coupled to a network;
during processing of the request to atomically upload the multiple files, receiving an additional file from the client computer and adding the additional file to the atomic multiple-file upload;
during the processing of the request to atomically upload the multiple files, deleting one file from the atomic multiple-file upload;
saving each file of the atomic multiple-file upload uploaded by the client computer in a session map;
sending status indicators to the client computer indicating status of an upload of a file from the client computer to the server computer;
receiving a submit message from the client computer indicating a user activated a submit control at the client computer only after completion of the uploading to the atomic multiple-file upload to the server computer;
atomically processing all files in the atomic multiple-file upload only after the submit message has been received from the client computer;
providing a single Java Server Faces (JSF) lifecycle for the uploaded files of the atomic multiple-file upload;
receiving a message from the client computer that uploading of the multiple files in the atomic multiple-file upload is completed; and
performing the single Java Server Faces (JSF) lifecycle, using the one or more processors, on all uploaded files stored in the session map when the atomic multiple-file upload is complete.

14. The non-transitory computer-readable storage medium of claim 13 further comprising encoded program code for execution by one or more computer processors, the program code when executed is further executable to:
responding to messages from the client computer to delete a file or cancel an upload.

15. The non-transitory computer-readable storage medium of claim 13 further comprising encoded program code for execution by one or more computer processors, the program code when executed is further executable to:
storing an uploaded file in the session map if a request header parameter is set to a "multiple" value.

16. The non-transitory computer-readable storage medium of claim 13, further comprising encoded program code for execution by one or more computer processors, the program code when executed is further executable to:
disposing of the multiple files in the atomic multiple-file upload after the JSF lifecycle is completed.

17. A client computer comprising: one or more digital processors coupled to a display and to a non-transitory processor-readable storage device, with the one or more digital processors configured to execute on or more instructions included in the non-transitory processor-readable storage device to perform the following acts:
displaying a component including a file select control for selecting multiple files to atomically upload to a server computer and an upload control to begin an atomic multiple-file upload of selected multiple files, with the component included in a page having a submit control;

setting a parameter included in a header of a request to a value "multiple", wherein the request specifies atomically uploading the selected multiple files;

transmitting the request to the server computer when the upload control is activated;

during processing of the request, transmitting an additional file from the client computer to the server computer with a request to add the additional file to the atomic multiple-file upload;

during the processing of the request, transmitting a request to delete one file from the atomic multiple-file upload;

transmitting a message from the client computer to the server computer indicating that uploading the multiple files in the atomic multiple-file upload is complete; and enabling the submit control, defined on the displayed page including the component, without error when all files in the atomic multiple-file upload have finished uploading, and wherein the submit control initiates a single Java Server Faces (JSF) lifecycle for the uploaded files of the atomic multiple-file upload stored in a session map after the atomic multiple-file upload is complete.

18. The client computer of claim 17 with the one or more processors further configured to perform the acts of:

receiving status indications from the server computer; and displaying the status indications.

19. The client computer of claim 17 with the one or more digital processors further configured to perform the act of:

displaying a progress bar for a file being uploaded indicating what portion of the file has been uploaded.

20. The client computer of claim 18 where the displaying the status indications further comprises:

displaying a failed icon if an upload of a particular file to the server computer fails and a retry control to retry uploading the particular file to the server computer.

21. A non-transitory computer-readable storage medium comprising encoded program code for execution by one or more computer processors on a client computer, the program code when executed is executable to:

displaying a component including a file select control for selecting multiple files to atomically upload to a server computer and an upload control to begin an atomic multiple-file upload of selected multiple files, with the component included in a page having a submit control;

setting a parameter included in a header of a request to a value "multiple", wherein the request specifies atomically uploading the selected multiple files;

transmitting the request to the server computer when the upload control is activated;

during processing of the request, transmitting an additional file from the client computer to the server computer with a request to add the additional file to the atomic multiple-tile upload;

during the processing of the request, transmitting a request to delete one file from the atomic multiple-file upload;

transmitting a message from the client computer to the server computer indicating that uploading the multiple files in the atomic multiple-file upload is complete; and enabling the submit control, defined on the displayed page including the component, without error when all files in the atomic multiple-file upload have finished uploading, and wherein the submit control initiates a single Java Server Faces (JSF) lifecycle for the uploaded files of the atomic multiple-file upload stored in a session map after the atomic multiple-file upload is complete.

22. The non-transitory computer-readable storage medium of claim 21 further comprising encoded program code for execution by one or more computer processors, the program code when executed is further executable to:

displaying a progress bar for a file being uploaded indicating what portion of the file has been uploaded.

23. The non-transitory computer-readable storage medium of claim 21 further comprising encoded program code for execution by one or more computer processors, the program code when executed is further executable to displaying a failed icon if an upload of a particular file to the server computer fails and a retry control to retry uploading the particular file to the server computer.

* * * * *

UNITED STATES PATENT AND TRADEMARK OFFICE
CERTIFICATE OF CORRECTION

PATENT NO. : 10,547,664 B2
APPLICATION NO. : 13/848648
DATED : January 28, 2020
INVENTOR(S) : Kinebuchi et al.

Page 1 of 1

It is certified that error appears in the above-identified patent and that said Letters Patent is hereby corrected as shown below:

In the Claims

Column 9, Line 20, Claim 9, delete "on" and insert -- one --, therefor.

Column 9, Line 64, Claim 12, delete "claim 1," and insert -- claim 9, --, therefor.

Column 10, Line 6, Claim 13, delete "multiple-tile" and insert -- multiple-file --, therefor.

Column 10, Line 60, Claim 17, delete "on" and insert -- one --, therefor.

Column 12, Line 12, Claim 21, delete "multiple-tile" and insert -- multiple-file --, therefor.

Signed and Sealed this
Third Day of November, 2020

Andrei Iancu
*Director of the United States Patent and Trademark Office*